United States Patent [19]
Guha et al.

[11] Patent Number: 6,049,797
[45] Date of Patent: Apr. 11, 2000

[54] METHOD, APPARATUS AND PROGRAMMED MEDIUM FOR CLUSTERING DATABASES WITH CATEGORICAL ATTRIBUTES

[75] Inventors: Sudipto Guha, Stanford, Calif.; Rajeev Rastogi, New Providence; Kyuseok Shim, Bedminster, both of N.J.

[73] Assignee: Lucent Technologies, Inc., Murray Hill, N.J.

[21] Appl. No.: 09/055,940

[22] Filed: Apr. 7, 1998

[51] Int. Cl.[7] .................................................... G06F 17/30
[52] U.S. Cl. .......................... 707/6; 707/2; 707/3; 707/5; 707/101; 707/104; 705/27
[58] Field of Search ................................ 707/2, 3, 5, 6, 707/101, 104; 702/179; 704/256; 705/27; 706/12, 50; 709/224; 345/433

[56] References Cited

U.S. PATENT DOCUMENTS

| | | | |
|---|---|---|---|
| 5,325,466 | 6/1994 | Kornacker | 706/61 |
| 5,675,791 | 10/1997 | Bhide et al. | 707/205 |
| 5,706,503 | 1/1998 | Poppen et al. | 707/100 |
| 5,710,915 | 1/1998 | McElhiney | 707/3 |
| 5,790,426 | 8/1998 | Robinson | 702/179 |
| 5,839,105 | 11/1998 | Ostendorf | 704/256 |
| 5,861,891 | 1/1999 | Becker | 345/437 |
| 5,884,282 | 3/1999 | Robinson | 705/27 |
| 5,884,305 | 3/1999 | Kleinberg | 707/6 |
| 5,960,435 | 9/1999 | Rathmann | 707/101 |
| 5,983,224 | 11/1999 | Singh | 707/6 |

OTHER PUBLICATIONS

Jeffrey Scott Vitter. Random Sampling With A Reservoir. ACM Transactions on Mathematical Software, 11(1):37–57, 1985.

Martin Ester, et al. A Density–Based Algorithm For Discovering Clusters In Large Spatial Database With Noise. In International Conference on Knowledge Discovery in Databases and Data Mining (KDD–96), Montreal, Canada, Aug. 1996.

Tian Zhang, et al. Birch: An Efficient Data Clustering Method For Very Large Databases. In Proceedings of the ACM SIGMOD Conference on Management of Data, pp. 103–114, Montreal, Canada, Jun. 1996.

Eui–Hong Han, et al. Clustering Based On Association Rule Hypergraphs. Technical report, 1997 SIGMOD Workshop on Research Issues on Data Mining and Knowledge Discovery, Jun. 1997.

Martin Ester, et al. A Database Interface For Clustering In Large Spatial Databases. In International Conference on Knowledge Discovery in Databases and Data Mining (KDD–95), Montreal, Canada, Aug. 1995.

Raymond T. Ng, et al. Efficient And Effective Clustering Methods For Spatial Data Mining. In Proc. of the VLDB Conference, Santiago, Chile, Sep. 1994.

*Primary Examiner*—Thomas G. Black
*Assistant Examiner*—Diane D. Mizrahi
*Attorney, Agent, or Firm*—Dickstein Shapiro Morin & Oshinsky LLP

[57] ABSTRACT

The present invention relates to a computer method, apparatus and programmed medium for clustering databases containing data with categorical attributes. The present invention assigns a pair of points to be neighbors if their similarity exceeds a certain threshold. The similarity value for pairs of points can be based on non-metric information. The present invention determines a total number of links between each cluster and every other cluster bases upon the neighbors of the clusters. A goodness measure between each cluster and every other cluster based upon the total number of links between each cluster and every other cluster and the total number of points within each cluster and every other cluster is then calculated. The present invention merges the two clusters with the best goodness measure. Thus, clustering is performed accurately and efficiently by merging data based on the amount of links between the data to be clustered.

57 Claims, 6 Drawing Sheets

METHOD, APPARATUS AND PROGRAMMED MEDIUM FOR CLUSTERING DATABASES WITH CATEGORICAL ATTRIBUTES

FIELD OF THE INVENTION

This invention relates to the art of data mining, and in particular to method, apparatus and programmed medium for clustering databases with categorical attributes by using links to measure the similarity and proximity between data points and robustly merging clusters based on these links.

BACKGROUND OF THE INVENTION

The problem of data mining or knowledge discovery is becoming increasingly important in recent years. There is an enormous wealth of information embedded in large corporate databases and data warehouses maintained by retailers, telecom service providers and credit card companies that contain information related to customer purchases and customer calls. Corporations could benefit immensely in the areas of marketing, advertising and sales if interesting and previously unknown customer buying and calling patterns could be discovered from the large volumes of data.

Clustering is a useful technique for grouping data points such that points within a single group/cluster have similar characteristics, while points in different groups are dissimilar. For example, consider a market basket database containing one transaction per customer with each transaction containing the set of items purchased by the customer. The transaction data can be used to cluster the customers such that customers with similar buying patterns are in a single cluster.

For example, one cluster may consist of predominantly married customers with infants that buy diapers, baby food, toys, etc. (in addition to necessities like milk, sugar, butter, etc.), while another may consist of high-income customers that buy imported products like French and Italian wine, Swiss cheese and Belgian chocolate. The clusters can then be used to characterize the different customer groups, and these characterizations can be used in targeted marketing and advertising such that specific products are directed toward specific customer groups.

The characterization can also be used to predict buying patterns of new customers based on their profiles. For example, it may be possible to conclude that high-income customers buy imported foods, and then mail customized catalogs for imported foods to these high-income customers.

The above market basket database, containing customer transactions, is an example of data points with attributes that are non-numeric. Transactions in the database can be viewed as records with boolean attributes, each attribute corresponding to a single item. Further, in a record for a transaction, the attribute corresponding to an item is "true" if and only if the transaction contains the item; otherwise, it is "false." Boolean attributes themselves are a special case of categorical attributes.

The domain of categorical attributes is not limited to simply true and false values, but could be any arbitrary finite set of values. An example of a categorical attribute is color whose domain includes values such as brown, black, white, etc. A proper method of clustering in the presence of such categorical attributes is desired.

The problem of clustering can be defined as follows: given n data points in a d-dimensional space, partition the data points into k clusters such that the data points in a cluster are more similar to each other than data points in different clusters. Existing clustering methods can be broadly classified into partitional and hierarchical methods. Partitional clustering attempts to determine k partitions that optimize a certain criterion function. The most commonly used criterion function is:

$$E = \sum_{i=1}^{k} \sum_{\overline{x} \in C_i} d(\overline{x}, \overline{m_i}).$$

In the above equation, $m_i$ is the centroid of cluster $C_i$ while $d(\overline{x}, \overline{m_i})$ is the Euclidean distance between x and $m_i$. The Euclidean distance between two points $(x_1, x_2, \ldots x_d)$ and $(y_1, y_2, \ldots y_d)$ is $(\Sigma_{i=1}^{d}(x_i-y_i)^2)^{1/2}$. Thus the criterion function E attempts to minimize the distance of every point from the mean of the cluster to which the point belongs. A common approach is to minimize the criterion function using an iterative, hill-climbing technique. That is, starting with an initial number of k partitions, data points are moved from one cluster to another to improve the value of the criterion function.

While the use of the above criterion function could yield satisfactory results for numeric attributes, it is not appropriate for data sets with categorical attributes. For example, consider the above market basket database. Typically, the number of items and the number of attributes in such a database are very large (a few thousand) while the size of an average transaction is much smaller (less than a hundred). Furthermore, customers with similar buying patterns and, therefore, belonging to the same cluster, may buy a small subset of items from a much larger set that defines the cluster.

For instance, consider the cluster defined by the set of imported items like French wine, Swiss cheese, Italian pasta sauce, Belgian beer, etc. Every transaction within the cluster contains only a small subset of the above items. Thus, it is possible that a pair of transactions in a cluster will have a few items in common, but remain linked by a number of other transactions within the cluster (having a substantial number of items in common with the two transactions).

In addition, the set of items defining the clusters may not have uniform sizes. A cluster including common items such as diapers, baby food and toys, for example, will typically involve a large number of items and customer transactions, while the cluster defined by imported products will be much smaller. In the larger cluster, since the transactions are spread out over a larger number of items, most transaction pairs will have few items in common. Consequently, a smaller percentage of these transaction pairs will have a large number of items in common. Thus, the distances of the transactions from the mean of the larger cluster will be much larger.

Since the criterion function of the partitional clustering method is defined in terms of distance from the mean of a cluster, splitting large clusters generally occurs. By splitting larger clusters the distance between a transaction and the mean of the cluster is reduced and, accordingly, the criterion function is also reduced. Therefore, the partitional clustering method favors splitting large clusters. This, however, is not desirable since the large cluster is split even though transactions in the cluster are well connected and strongly linked.

Hierarchical clustering is a sequence of partitions in which each partition is nested into the next partition in the sequence. Current hierarchical clustering methods, however, are unsuitable for clustering data sets containing categorical attributes. For instance, consider a centroid-based hierarchical clustering method in which, initially, each point is treated as a separate cluster. Pairs of clusters whose centroids or means are the closest are then successively merged until the desired number of clusters remain. For categorical attributes, however, distances between centroids of clusters is a poor estimate of the similarity between them as is illustrated by the following example.

Consider a market basket database containing the following 4 transactions concerning items 1, 2, 3, 4, 5 and 6: (a) {1, 2, 3, 5}, (b) {2, 3, 4, 5}, (c) {1,4}, (d) {6}. The transactions can be viewed as points with boolean attributes (where 0 indicates that an item is missing while 1 indicates that an item is present in the transaction) corresponding to the items 1, 2, 3, 4, 5 and 6. The four points (a, b, c, d) thus become (1,1,1,0,1,0), (0,1,1,1,1,0), (1,0,0,1,0,0) and (0,0,0,0,0,1). Using the Euclidean distance metric to measure the closeness between points/clusters, the distance between the first two points (a and b) is $\sqrt{2}$, which is the smallest distance between any pairs of the four points. As a result, points a and b are merged by the centroid-based hierarchical approach. The centroid of the new merged cluster is (0.5,1,1,0.5,1,0). In the next step, the third and fourth points (c and d) are merged since the distance between them is $\sqrt{3}$ which is less than the distance between the centroid of the merged cluster and points c or d respectively. However, this leads to merging transactions {1, 4} and {6} that do not have a single item in common. Thus, using distances between the centroids of clusters while making decisions about the clusters to merge could cause points belonging to different clusters to be assigned to the same cluster.

Once points belonging to different clusters are merged, the situation gets progressively worse as the clustering progresses. What typically happens is a ripple effect, that is, as the cluster size grows, the number of attributes appearing in the mean go up, and their value in the mean decreases. This makes it very difficult to distinguish the difference between two points that differ on few attributes, or two points that differ on every attribute by small amounts. The following example will make this issue very clear.

Consider the means of two clusters (⅓, ⅓, ⅓, 0, 0, 0) and (0, 0, 0, ⅓, ⅓, ⅓) with roughly the same number of points. Even though, the two clusters have no attributes in common, the Euclidean distance between their means is less than the distance of a point (1, 1, 1, 0, 0, 0) to the mean of the first cluster even though the point has items in common with the first point. This is undesirable since the point shares common attributes with the first cluster. A method based on distance will merge the two clusters and will generate a new cluster with mean (⅙, ⅙, ⅙, ⅙, ⅙, ⅙).

An interesting side effect of this merger is that the distance of the point (1, 1, 1, 0, 0, 0) to the new cluster is even larger than the original distance of the point to the first of the merged clusters. In effect, what is happening is that the center of the cluster is spreading over more and more attributes. As this tendency starts, the cluster center becomes closer to other centers which also span a large number of attributes. Thus, these centers tend to spread across all attributes and lose the information about the points in the cluster that they represent.

"Set theoretic" similarity measures such as the Jaccard coefficient have often been used, instead of the Euclidean distance, for clustering data contained within databases. The Jaccard coefficient for similarity between transactions $T_1$ and $T_2$ is $$\frac{|T_1 \cap T_2|}{|T_1 \cup T_2|}.$$

With the Jaccard coefficient as the distance measure between clusters, centroid-based hierarchical clustering schemes cannot be used since the similarity measure is non-metric, and defined for only points in the cluster and not for its centroid. Therefore, a minimum spanning tree (MST) hierarchical clustering method or a hierarchical clustering method using a group average technique must also be employed. The MST method merges, at each step, the pair of clusters containing the most similar pair of points while the group average method merges the ones for which the average similarity between pairs of points is the highest.

The MST method is known to be very sensitive to outliers (an outlier is a noise impulse which is locally inconsistent with the rest of the data) while the group average method has a tendency to split large clusters (since the average similarity between two subclusters of a large cluster is small). Furthermore, the Jaccard coefficient is a measure of the similarity between only the two points in question. Thus it does not reflect the properties of the neighborhood of the points. Consequently, the Jaccard coefficient fails to capture the natural clustering of data sets forming clusters with categorical attributes that are close to each other as illustrated in the following example.

FIG. 1 illustrates two transaction clusters 10, 12 of a market basket database containing items 1, 2, . . . 8, 9. The first cluster 10 is defined by 5 items while the second cluster 12 is defined by 4 items. These items are shown at the top of the two clusters 10, 12. Note that items 1 and 2 are common to both clusters 10, 12. Each cluster 10, 12 contains transactions of size 3, one for every subset of the set of items that define the clusters 10, 12.

The Jaccard coefficient between an arbitrary pair of transactions belonging to the first cluster 10 ranges from 0.2 (e.g., {1, 2, 3} and {3, 4, 5}) and 0.5 (e.g., {1, 2, 3} and {1, 2, 4}). Note that even though {1, 2, 3} and {1, 2, 7} share two common items and have a high coefficient (0.5), they belong to different clusters 10, 12. In contrast, {1, 2, 3} and {3, 4, 5} have a lower coefficient (0.2), but belong to the same cluster 10.

The MST method would first merge transactions {1, 2, 3} and {1, 2, 7} since the Jaccard coefficient has the maximum value (0.5). Once this merger occurs, the new cluster may subsequently merge with transactions from both clusters 10, 12, for example, {1, 3, 4} or {1, 6, 7}, since these are very similar to transactions in the new cluster. This is an expected result since it is well known that the MST method is fragile when clusters are not well-separated.

The use of a group average technique for merging clusters ameliorates some of the problems with the MST method. However, it may still fail to discover the correct clusters. For example, similar to the MST method, the group average method would first merge a pair of transactions containing items 1 and 2, but belonging to the different clusters 10, 12. The group average of the Jaccard coefficient between the new cluster and every other transaction containing both 1 and 2 is still the maximum (0.5). Consequently, every transaction containing both 1 and 2 may get merged together into a single cluster in subsequent steps of the group average method. Therefore, transactions {1, 2, 3} and {1, 2, 7} for the two separate clusters 10, 12 may be assigned to the same cluster by the time the method completes.

The problem of clustering related customer transactions in a market basket database has recently been addressed by using a hypergraph approach. Frequent itemsets used to generate association rules are used to construct a weighted hypergraph. Each itemset is a hyperedge in the weighted hypergraph and the weight of the hyperedge is computed as the average of the confidences for all possible association rules that can be generated from the itemset. Then, a hypergraph partitioning procedure is used to partition the items such that the sum of the weights of hyperedges that are cut due to the partitioning is minimized. The result is a clustering of items (not transactions) that occur together in the transactions. The item clusters are then used as the description of the cluster and a scoring metric is used to assign customer transactions to the best item cluster. For example, a transaction T may be assigned to the item cluster $C_i$ for which the ratio $$\frac{|T \cap C_i|}{|C_i|}$$

is the highest.

The rationale for using item clusters to cluster transactions is questionable. For example, the approach makes the assumption that itemsets that define the clusters are disjoint and have no overlap among them. This may not be true in practice since transactions in different clusters may have a few common items. For instance, consider the market basket database in the above example (FIG. 1). With minimum support set to 2 transactions, the hypergraph partitioning scheme generates two item clusters of which one is {7} and the other contains the remaining items (since 7 has the least hyperedges to the other items). However, this results in transactions {1, 2, 6} (from cluster 12) and {3, 4, 5} (from cluster 10) being assigned to the same cluster since both have the highest score with respect to the big item cluster.

Accordingly, a clustering method that can correctly identify clusters containing data with categorical attributes, while efficiently handling outliers, is still needed.

SUMMARY OF THE INVENTION

This invention provides a method, apparatus and programmed medium for clustering databases capable of identifying clusters containing data with categorical attributes while efficiently handling outliers.

This invention also provides a method, apparatus and programmed medium for clustering large databases capable of identifying clusters containing data with categorical attributes with reduced time and space complexities.

The invention accomplishes the above and other objects and advantages by providing a method of clustering databases containing data with categorical attributes that uses links to measure the similarity and proximity between the data points and then robustly merges clusters based on these links.

Using link s between data points, instead of distance metrics, allows the present invention to overcome the problems of the partitional and Jaccard coefficient clustering schemes. The present invention assigns a pair of points to be neighbors if their similarity exceeds a certain threshold. The similarity value for pairs of points can be based on distances or any other non-metric similarity function obtained from a domain expert/similarity table. The number of links between a pair of points is the number of common neighbors for the points. Points belonging to a single cluster will generally have a large number of common neighbors, and consequently more links. Thus, during clustering, merging clusters and points with the most number of links first will result in better and more meaningful clusters.

Unlike distances or similarities between a pair of points which are local properties involving only the two points in question, links incorporate global information about the other points in the neighborhood of the two points being considered. The larger the number of links between a pair of points, the greater the likelihood that they belong to the same cluster. Thus, clustering using links injects global knowledge into the clustering process and is thus more robust. For example, even though a pair of clusters are close to each other and have a few points that are similar, these points will not be coalesced into the same cluster since they will have very few common neighbors and thus very few links.

In another embodiment of the present invention, time and space complexities are reduced by drawing a random sample of data points from the database. Random samples of moderate sizes preserve information about the clusters while reducing execution time and memory requirements, thus enabling the present invention to correctly cluster the input quickly and more efficiently.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

Figure 1:
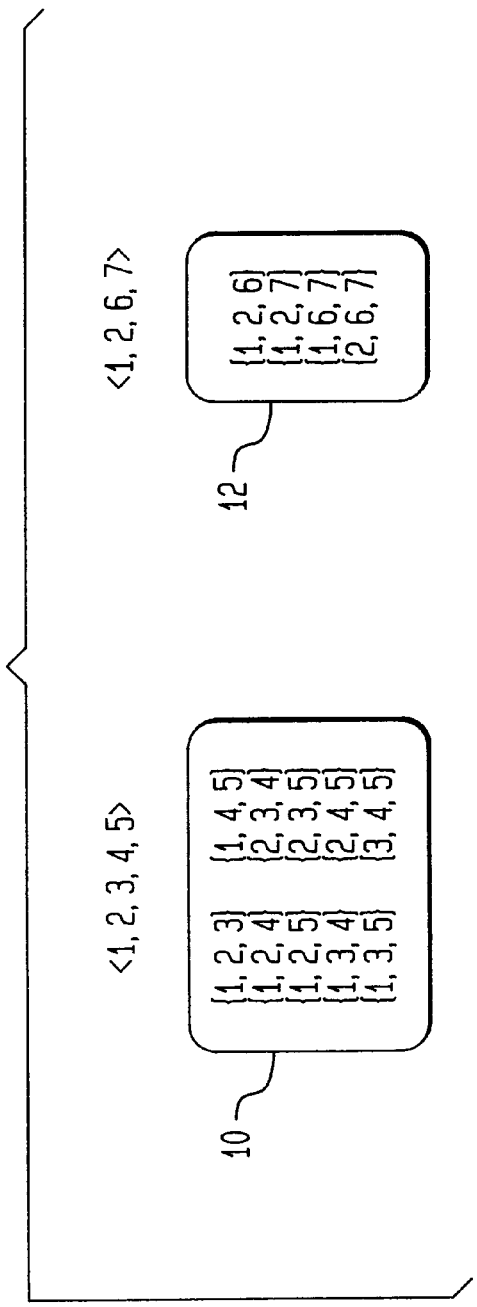
FIG. 1 is an illustration of a target clustering of a database containing data with categorical attributes.
Figure 2:
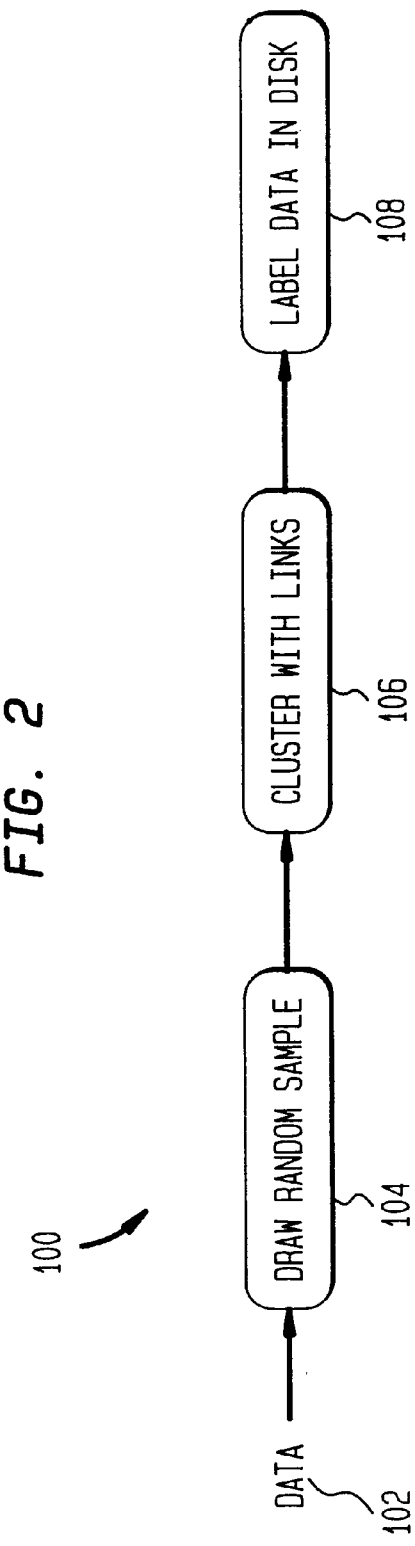
FIG. 2 is a block diagram illustrating the overall method of a preferred embodiment of the present invention.

FIG. 2 illustrates, generally, the method steps 100 involved in clustering a database according to various preferred embodiments of the present invention. For example, a first embodiment of the present invention performs method step 106, while the preferred embodiment performs all steps 104 through 108. For overview purposes, all of the steps shown in FIG. 2 are now briefly described. In step 104, the method begins by drawing a random sample of data points from the input data 102. This random sample is then clustered by first generating links between the points and then clustering the links in step 106. Once the clustering of the random sample is completed, the clusters involving only the random points are used to label the remainder of the data set in step 108.

Figure 3:
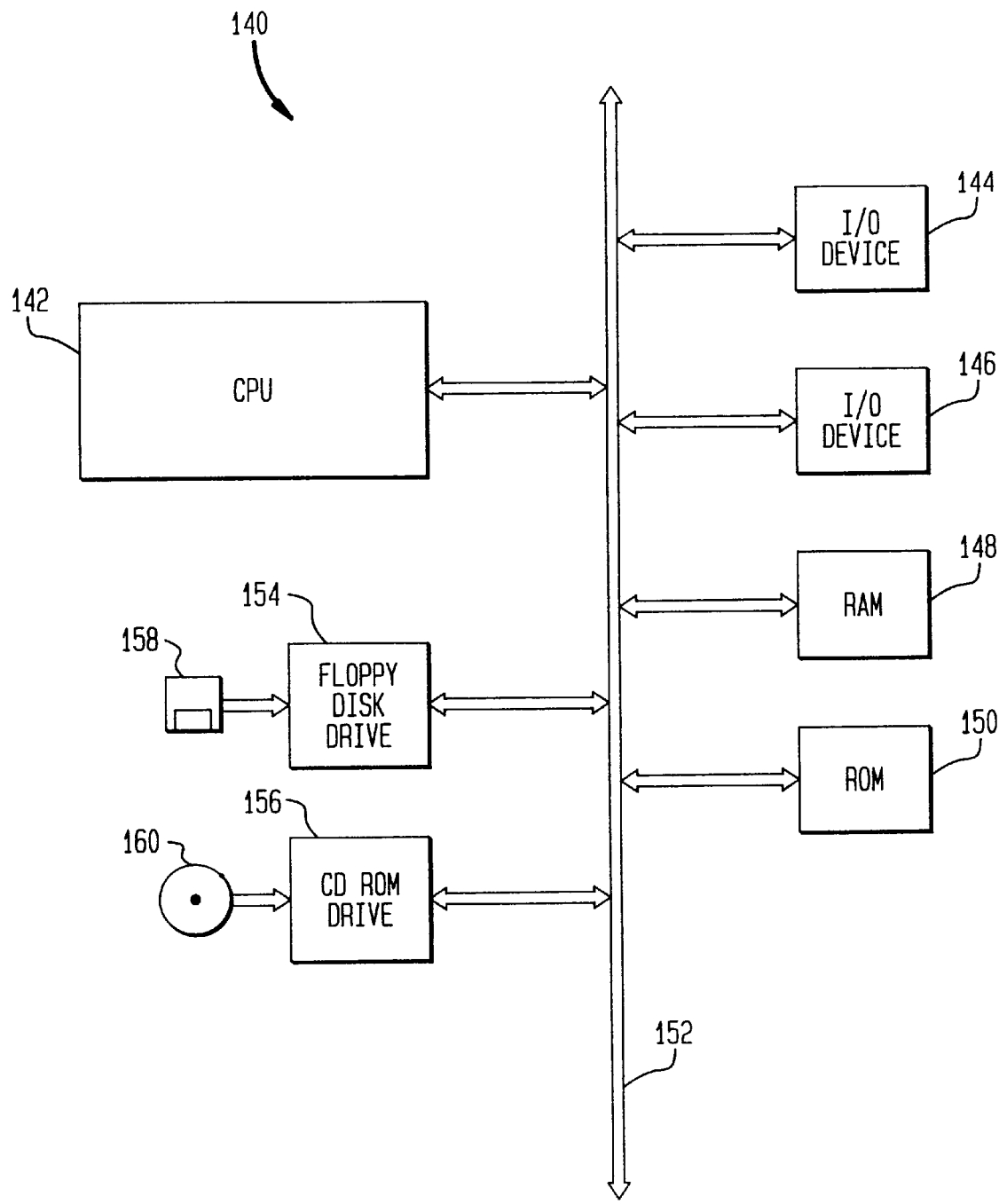
FIG. 3 illustrates a block diagram of a computer system for accomplishing the clustering method of FIG. 2.

Referring now to FIG. 3, in a preferred embodiment, the clustering method 100 of the present invention is performed on a programmed general purpose computer system 140. The computer system 140 includes a central processing unit (CPU) 142 that communicates to an input/output (I/O) device 144 over a bus 152. A second I/O device 146 is illustrated, but is not necessary to practice the method 100 of the present invention. The computer system 140 also includes random access memory (RAM) 148, read only memory (ROM) 150, and may include peripheral devices such as a floppy disk drive 154 and a compact disk (CD) ROM drive 156 that also communicate with the CPU 142 over the bus 152. It must be noted that the exact architecture of the computer system 140 is not important and that any combination of computer compatible devices may be incorporated into the system 140 as long as the method 100 of the present invention can operate on a system 140 having a CPU 142, RAM 148 and storage memory as described below. Moreover, the program for CPU 142 which causes it to implement the invention may be stored in ROM 150, CD-ROM 156, floppy disk 158, a hard drive or any other medium capable of storing a program. During execution of the program it will be loaded into RAM 148. All of these devices communicate with CPU 142 as is well known in the art.

The CPU 142 performs logical and mathematical operations required by the method 100 of the present invention, such as data manipulation and comparisons, as well as other arithmetic and logical functions generally understood by those of ordinary skill in the art. The RAM 148 is used to store the data 102 to be clustered, clustered data and program instructions required to implement the method 100 of the present invention and can be comprised of conventional random access memory (RAM), bulk storage memory, or a combination of both, as generally understood by those of ordinary skill in the art. The I/O devices 144, 146 are responsible for interfacing with an operator of the computer system 140 or with peripheral data devices such as a hard drive or other device (not shown) to receive or distribute the data 102 as generally understood by those of ordinary skill in the art.

The following definitions are required for a better understanding of the clustering method of the present invention. The method will be described in detail afterwards. Neighbors of a point are those points that are considerably similar to it. Let $sim(p_i, p_j)$ be a similarity function that is normalized and captures the closeness between the pair of points $p_i$ and $p_j$. The function sim could be one of the well-known distance metrics (e.g., Euclidean), or it could even be non-metric. The function sim comprises values between 0 and 1, with larger values indicating that the points are more similar. Given a threshold $\theta$ between 0 and 1, a pair of points $P_i$ and $P_j$ are defined to be neighbors if:

$$sim(p_i, p_j) \geq \theta.$$

In the above equation, $\theta$ is a user-defined parameter that can be used to control how close a pair of transactions must be in order to be considered neighbors. Thus, higher values of $\theta$ correspond to a higher threshold for the similarity between a pair of points before they are considered neighbors. Assuming that sim is 1 for identical points and 0 for totally dissimilar points, a value of 1 for $\theta$ constrains a point to be a neighbor to only other identical points. On the other hand, a value of 0 for $\theta$ permits any arbitrary pair of points to be neighbors. Depending on the desired closeness, an appropriate value of $\theta$ may be chosen by the user. Preferably, $\theta$ will have a value between 0.5 and 0.8.

For market basket data, the database consists of a set of transactions, each of which is a set of items. A possible definition for $sim(T_1, T_2)$, the similarity between the two transactions $T_1$ and $T_2$ is the following:

$$sim(T_1, T_2) = \frac{|T_1 \cap T_2|}{|T_1 \cup T_2|}$$

Where $|T_i|$ is the number of items in $T_i$. The more items that the two transactions $T_1$ and $T_2$ have in common, that is, the larger $|T_1 \cap T_2|$ is, the more similar they are. Dividing by $|T_1 \cup T_2|$ is the scaling factor which ensures that $\theta$ is between 0 and 1. Thus, the above equation computes the relative closeness based on the items appearing in both transactions $T_1$ and $T_2$.

The above definition of a neighbor rules out subsets of a transaction that are very small in size. A typical example is that of a store where milk is bought by everyone. A transaction with only milk will not be considered very similar to other bigger transactions that contain milk. Also, note that for a pair of transactions $T_1$, and $T_2$, sim can take at most $\min\{|T_1|, |T_2|\}+1$ values. Thus, there are at most $\min\{|T_1|, |T_2|\}+1$ distinct similarity levels between the two transactions. As a result, if most transactions have uniform sizes, then the possible values for sim are greatly reduced which simplifies the choice of an appropriate value for the parameter $\theta$.

Data sets with categorical attributes are similarly handled. Categorical data typically is of fixed dimension and is more structured than market basket data. However, it is still possible that in certain records, values may be missing for certain attributes.

The present invention handles categorical attributes with missing values by modeling each record with categorical attributes as a transaction. Corresponding to every attribute A and value v in its domain, we introduce an item A.v. A transaction $T_i$ for a record contains A.v if and only if the value of attribute A in the record is v. If the value for an attribute is missing in the record, then the corresponding transaction does not contain items for the attribute. Thus missing values are ignored and the aforementioned similarity function can be used to compute similarities between the records by determining the similarity between the corresponding transactions.

It must be noted that the above suggested method for dealing with missing values is one of several possible ways to handle missing values and the present invention should not be so limited. For example, when dealing with time series data, the following method could be used. For time series data, each data point consists of a sequence of time slot and value pairs. Each data point can be viewed as a record with every time slot corresponding to a single categorical attribute. The values that are possible in the time slot then constitute the domain of the categorical attribute. Missing values for attributes can frequently result since two individual time series could be sampled at different times. For example, for young mutual funds that began a year ago, prices for time periods preceding the last year do not exist.

In this case, in order to compute the similarity between two records, the present invention only considers attributes that have values in both records. This way, if two records are identical for the attributes that do not contain missing values, then it is concluded that the similarity between them is high even though one of the records may have a missing value. Thus, for a pair of records, the transaction for each record only contains items that correspond to attributes for which values are not missing in either record. The similarity between the transactions can then be computed as described above.

The present invention utilizes a definition of a link($p_i$, $p_j$) to be the number of common neighbors between points $p_i$ and $p_j$ (common neighbors meaning points that are neighbors to both points $p_i$ and $p_j$). From the definition of links, it follows that if link($p_i$, $p_j$) is large (that is, there are a large number of common neighbors between the points), then it is highly probable that $p_i$ and $p_j$ belong to the same cluster. The method of the present invention exploits this property when making decisions about the points to merge into a single cluster.

This link-based approach adopts a global approach to the clustering problem. It captures the global knowledge of neighboring data points into the relationship between individual pairs of points. Thus, since the clustering procedure of the present invention utilizes the information about links between points when making decisions on the points to be merged into a single cluster, the method for clustering is very robust.

Links between a pair of points, in effect, are the number of distinct paths of length 2 between points $p_i$ and $p_j$ such that every pair of consecutive points on the path are neighbors. Alternative definitions of links, based on paths of 3 or more, are also possible although they include additional information that may not be desired and are less efficient timewise.

The method of the present invention utilizes a criterion function to characterize the best clusters. It is desired that each cluster has a high degree of connectivity, therefore, there is the need to maximize the sum of link($P_q$, $P_r$) for data point pairs $P_q$ and $P_r$ belonging to a single cluster and at the same time, minimize the sum of link($P_q$, $P_r$) in different clusters. This leads to the following criterion function that is to be maximized for the k desired clusters:

$$E_l = \sum_{i=1}^{k} n_i * \sum_{P_q, P_r \in C_i} \frac{link(p_q, p_r)}{n_i^{1+2f(\theta)}},$$

where $C_i$ denotes cluster i of size $n_i$ and $f(\theta)$ is a function that is dependent on the data set, as well as the kind of clusters desired, and has the following important property: each point belonging to cluster $C_i$ has approximately $n_i^{f(\theta)}$ neighbors in $C_i$.

One possibility for $f(\theta)$ is $$\frac{1-\theta}{1+\theta}$$

for market basket data. This can be informally derived under the simplifying assumptions that transactions are of approximately the same size t and are uniformly distributed amongst the m items purchased by customers in cluster $C_i$. For some constant $c \leq 1$, the number of transactions in the cluster is approximately $$\binom{mc}{t}$$

and the number of transactions whose similarity to a particular transaction $T_i$ exceeds $\theta$ is approximately $$\frac{\binom{mc}{(1-\theta)t}}{1-\theta}.$$

Thus, the number of neighbors for a transaction in $C_i$ is approximately $$n^{\frac{1-\theta}{1+\theta}} \text{ and } f(\theta) = \frac{1-\theta}{1+\theta}.$$

The criterion function is used to estimate the "goodness" of clusters. The best clustering of points are those that resulted in the highest values for the criterion function. Since the goal of the present invention is to perform clustering that maximizes this criterion function, the present invention utilizes a goodness measure, similar to the criterion function, to determine the best pair of clusters to merge. Briefly, the goodness measure is based upon the total number of cross links (that is, links between a cluster and another cluster) and an estimated number of cross links (that is, an estimated number of links between a cluster and another cluster). For a pair of clusters $C_i$, $C_j$, let link [$C_i$, $C_j$] store the number of cross links between clusters $C_i$ and $C_j$, that is, $$\sum_{p_q \in C_i, p_r \in C_j} link(p_q, p_r)$$

Then, the goodness measure g($C_i$, $C_j$) for merging clusters $C_i$, $C_j$ is defined as follows:

$$g(C_i, C_j) = \frac{link[C_i, C_j]}{(ni+nj)^{1+2f(\theta)} - ni^{1+2f(\theta)} - nj^{1+2f(\theta)}}$$

The pair of clusters for which the above goodness measure is maximum is the best pair of clusters to be merged at any given step.

Figure 4:
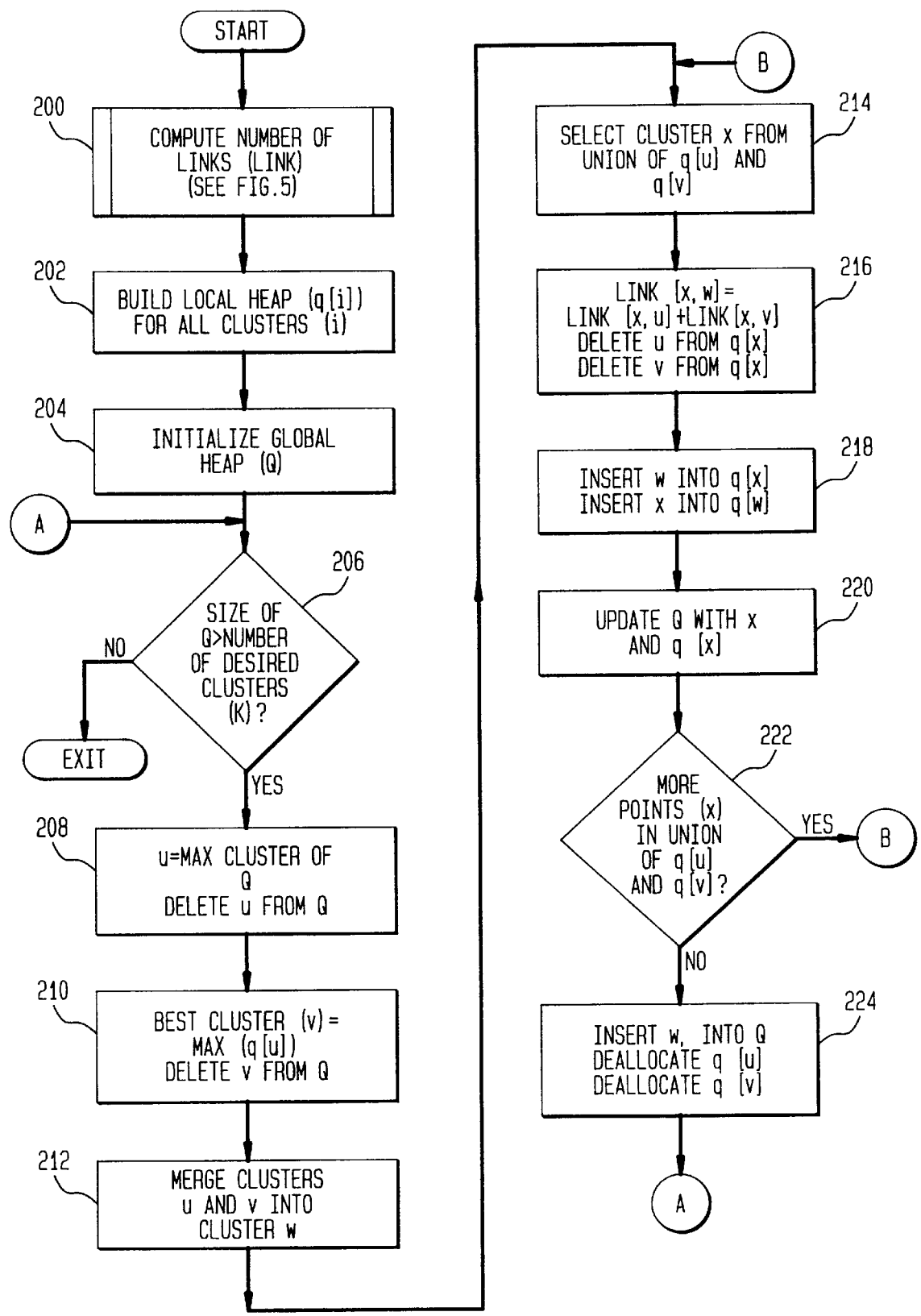
FIG. 4 illustrates, in flow chart form, the clustering method of a preferred embodiment of the present invention.
Figure 5:
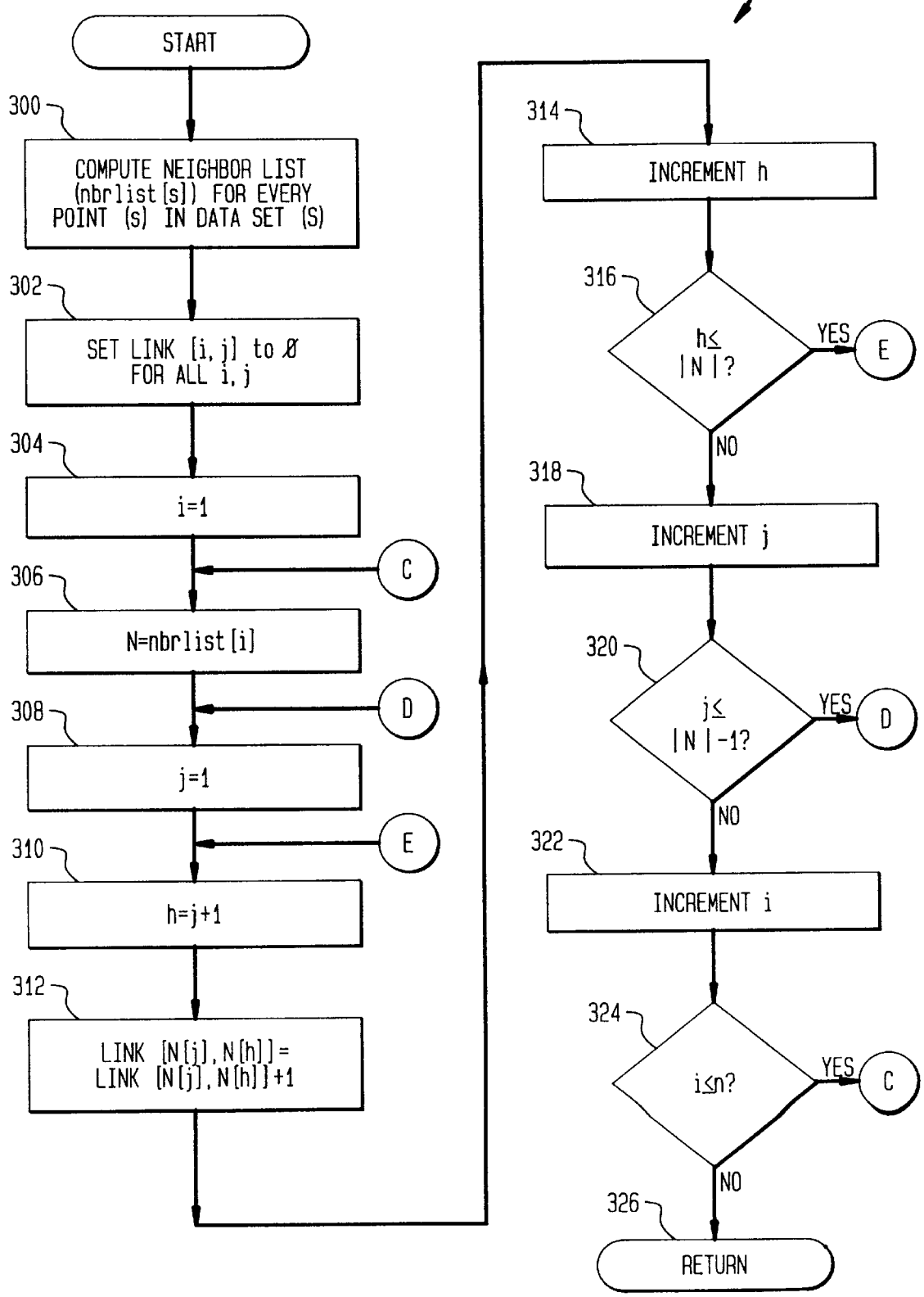
FIG. 5 illustrates, in flow chart form, the link computation method of a preferred embodiment of the present invention.

Referring now to FIG. 4, a detailed description of the clustering method of the present invention now follows (this embodiment performs step 106 illustrated in FIG. 2). The input parameters of the method are the input data set S containing n points to be clustered and the number of desired clusters k. Initially, each point is considered to be a separate cluster i. In step 200, the procedure begins by computing the number of links between pairs of points within the data set S. A detailed description of the method used to compute the number of links between the points is described below (FIG. 5).

In step 202, a local heap q[i] is created for each cluster i. Therefore, at the initial stages of the clustering method of the present invention, there is a local heap q[i] for each data point in the data set S. Each local heap q[i] contains every cluster j forming a link with cluster i, link[i,j], that is non-zero (that is, clusters i and j share common neighbors). Link[i,j] has been initialized by the link computation procedure described below (FIG. 5). The clusters j in q[i] are ordered in the decreasing order of the goodness measure (as defined above) with respect to i, designated as g(i, j).

In addition to the local heaps q[i] for each cluster i, the method of the present invention also maintains a single global heap Q that contains all of the clusters. The global heap Q is initialized in step 204 as follows. The clusters contained within the global heap Q are ordered in the decreasing order of their best goodness measures. Thus, g(i, max(q[i])) is used to order the various clusters i in the global heap Q, where max(q[i]), the max element in the Local heap q[i], is the best cluster to merge with cluster i. As will be discussed below, during each step of the method of the present invention, the max cluster i in the global heap Q and the max cluster in the local heap q[i] are the best pair of clusters to be merged.

Once the global heap Q and the local heaps q[i] are initialized, the method loops between steps 206 and 224 (main loop). The looping continues until a predetermined termination condition is met. Step 206 illustrates that the predetermined termination condition allows looping until a predetermined desired number of k clusters remain in the global heap Q; at which point the method is completed (step 230). In addition, another predetermined termination condition allows the clustering method to terminate if the number of links between every pair of the remaining clusters becomes zero (indicating that the remaining clusters do not share any common neighbors and that they should not be merged together).

The cluster at the top of the global heap Q is the cluster with the best goodness measures. Thus, at step 208, the max cluster u from the global heap Q is extracted from and deleted from the global heap Q. At step 210, the local heap q[u] for the extracted cluster u is used to determine the best cluster v for cluster u. Since clusters u and v will be merged, the entry for cluster v is also deleted from the global heap Q in step 210. Clusters u and v are then merged in step 212 to create a new cluster w containing all of the points from clusters u and v.

Once the new cluster w is created, the method of the present invention loops between steps 214 and 222 (secondary loop) to (1) replace the clusters u and v with the new merged cluster w for every cluster i that contains u or v in its local heap q[i], and (2) create a new local heap q[w] for cluster w. The looping continues until clusters u and v are replaced by the new merged cluster w for every cluster i that contains u or v in its local heap q[i], at which point the secondary loop is completed and the method continues at step 224.

At step 214, a cluster x is selected from the union of the clusters contained within the local heap q[u] of cluster u and the local heap q[v] of cluster v. At step 216, the number of links between clusters x and w are calculated by adding the number of links between clusters x and u to the number of links between clusters x and v. Additionally, in step 216, clusters u and v are deleted from the local heap q[x] of cluster x.

In step 218, a new goodness measure g(x, w) for the pair of clusters x and w is computed and the two clusters are inserted into each other's local heaps q[x] and q[w]. It must be noted that q[w] can only contain clusters that were previously either in q[u] or q[v] since these are the only clusters that have non-zero links with cluster w.

In step 220, the global heap Q is updated with cluster x, since as a result of merging clusters u and v, it is possible that clusters u or v were previously the best to be merged with x and now w becomes the best cluster for being merged with other clusters i. Furthermore, it is also possible that neither clusters u or v were the best cluster to merge with x, but now w is a better cluster to merge with x. For such cases, whenever the max cluster in the local heap q[x] for x changes, cluster x must be relocated within the global heap Q.

When all of the clusters x, in the union of the clusters within the local heaps q[u] and q[v] of the merged clusters u and v, have been examined in the secondary loop (steps 214 to 222), the method continues at step 224. At this point, clusters u and v are replaced by the new merged cluster w for every cluster i that contained u or v in its local heap q[i].

In step 224, the merged cluster is inserted into the global heap Q and the method continues back at step 206 for another pass through the main loop (steps 206 to 224). The main loop completes (step 230) when the number of remaining clusters contained within the global heap Q matches the desired number of clusters k. Alternatively, the main loop is completed (step 230) when the number of links between every pair of the remaining clusters becomes zero (indicating that the remaining clusters have no common neighbors and should not be merged with each other).

Referring to FIG. 5, the method of computing the number of links between pairs of points is as follows. Briefly, a list of neighbors is computed for every data point s in the data set S. The method examines all the neighbors of a data point s (the relationship between the data point and its neighbors will be, hereinafter, referred to as a pair of points or pair of neighbors). For each pair of neighbors of the data point s, the data point contributes one link. By repeating this process for every point s in the data set S, and keeping track of the link count for each pair of neighbors, the link counts for all pairs of points of the data set S will be obtained.

The procedure for computing the number of links between pairs of points begins by computing a neighbor list nbrlist[s] for every data point s within the data set S (step 300). Step 302 is an initialization step in which a link counter array link[i,j] is set to 0 for all combinations of i an j; where i and j represent a pair of points. In step 304, loop counter i is set to 1 in preparation of the first pass through the main loop (steps 306 to 324) of the link computation procedure. The main loop terminates (step 326) only after looping n times (that is, for the number n of data points s within the data set S).

In step 306, the neighbors N of a point (designated by loop counter i) from data set S are retrieved from the neighbor list nbrlist[i]. In step 308, a secondary loop counter j is set to 1 in preparation of the first pass through a secondary loop (steps 308 to 320) of the link computation procedure. The secondary loop terminates (step 322) only after looping for the number of $|N|-1$ neighbors for the point being considered.

In step 310 a third loop counter h is set to j+1 (that is, one more than the secondary loop counter j) in preparation for the following link counting steps (steps 312 to 316). In step 312, the link counter array link[i,j] is indexed by the pair of neighbors N[j] and N[h] from the neighbors of the point being considered. This indexing represents one pair of neighbors N of point s (represented in the main loop by the main loop counter i). As stated above, a pair of neighbors N constitutes one link. Accordingly, link[N[j], N[h]] is set to the previous value of link[N[j], N[h]]+1 to count the new link between the pair of neighbors N[j] and N[h] of data point s (represented by i). In step 314, the third loop counter h is incremented in preparation of another pass through the counting loop (312 to 316). Step 316 determines if there are more neighbors N[h] to count links between neighbor N[j] (that is, if the third loop counter h is $\leq$ the number $|N|$ of neighbors for the point being considered). If there are no more neighbors N[h], the method continues at step 318.

Step 318 increments the secondary loop counter j in preparation for another pass through the secondary loop (steps 308 Lo 320). Step 320 determines if there is another neighbor N[j] to undergo the link counting loop (that is, if the secondary loop counter j is $\leq$ the number $|N|-1$ of neighbors for the point being considered). If there are no more neighbors N[j], the method continues at step 322.

Step 322 increments the main loop counter i in preparation for another pass through the main loop (steps 306 to 324). Step 324 determines if there is another point s (represented by main loop counter i) in the data set S to be considered and to undergo the aforementioned link counting loops (that is, if the main loop counter i is ≦ the number n of data points in the data set S). If there are no more neighbors N[j], the method is completed (step 326). Having completed, the link computation procedure has counted and stored all the links link[i,j] between every possible pairs of points within the data set S.

It must be noted that the link computation can be performed by other methods. For example, by using an n×n adjacency matrix A (n is the number of data points s in the data set S) in which an entry in the matrix A[i,j] is either a 1 (if there is a link between points i and j) or a 0 (no link) the number of links can be obtained by multiplying the adjacency matrix A with itself. That is, the number of links would be A×A. This method, however, is less efficient than the procedure illustrated in FIG. 5.

The time and space complexity of the clustering method of the present invention, for n input data points, is now examined. Time complexity will be expressed as an order of magnitude O( ). A time complexity of $O(n^2)$, for example, indicates that if the input size n doubles then the method requires four times as many steps to complete. Space complexity will also be expressed as an order of magnitude O( ). A space complexity of $O(n^2)$, for example, indicates that if the input size n doubles then four times as much working storage will be required.

It is possible to compute links among pairs of points in $O(n^{2.37})$ using the matrix multiplication technique, or alternatively in $O(n^2 m_a)$ time for the procedure illustrated in FIG. 5 (where $m_a$ is the average number of neighbors). The space requirement for the link computation is at most n(n+1)/2, when every pair of points are linked. However, generally, not every pair of points will have links between them and the storage requirements are much smaller. It can be shown that the space requirement to be $O(\min\{nm_m m_a, n^2\})$ where $m_m$, is the maximum number of neighbors for a point. This holds true because a point i can have links to at most $\min\{n, m_m m_i\}$ other points.

The initial time to build every local heap q[i] is O(n) (a heap for a set of n input clusters can be built in time that is linear in the number of clusters). The global heap Q also has at most n clusters initially, and can be constructed in O(n) time as well. The main loop (steps 206 to 222) is executed O(n) times. The secondary loop (steps 214 to 222) dominates the complexity of the clustering method of the present invention. Since the size of each local heap q[i] can be n in the worst case, and the new merged cluster w may need to be inserted in O(n) local heaps q[i], the time complexity of the secondary loop becomes O(n log n), and that of the main loop is $O(n^2 \log n)$ in the worst case. Therefore, the entire clustering procedure of the present invention has a worst-case time complexity of $O(n^2 + nm_m m_a + n^2 \log n)$.

The space complexity of the method of the present invention depends on the initial size of the local heaps q[i]. The reason for this is that when two clusters are merged, their local heaps are deleted and the size of the new cluster's local heap can be no more than the sum of the sizes of the local heaps of the merged clusters. Since each local heap only contains those clusters to which it has non-zero links, the space complexity of our clustering algorithm is the same as that of the link computation, that is, $O(\min\{n^2, nm_m m_a\})$ In a second embodiment of the present invention (steps 104 to 108 illustrated in FIG. 2), enhancements are made such that the clustering method can efficiently cluster very large databases. In order to handle large data sets, an effective mechanism for reducing the size of the input to the method of the present invention is required. One approach to achieving this is via random sampling of the input data set; the key idea is to apply the clustering method of the present invention to a random sample drawn from the data set rather than the entire data set. Typically, the random sample will fit in main-memory and will be much smaller than the original data set. Consequently, significant improvements in execution time can be realized. Also, random sampling can improve the quality of clustering since it has the desirable effect of filtering outliers.

Figure 6:
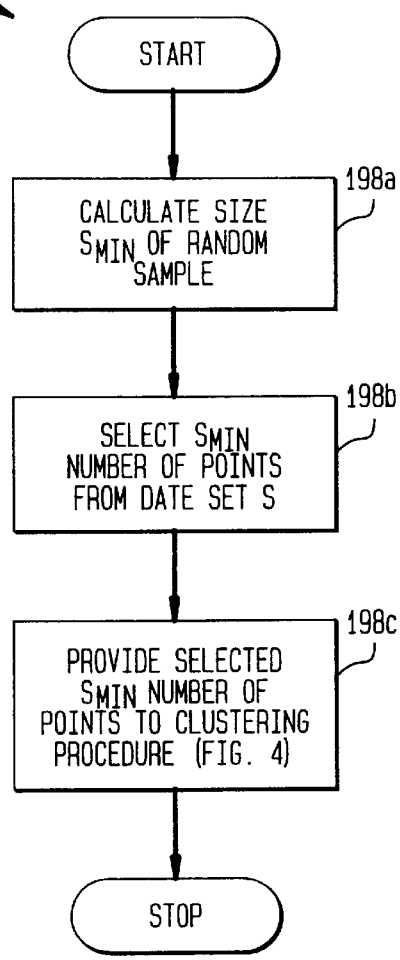
FIG. 6 illustrates, in flow chart form, the process of selecting a random data set in accordance with a preferred embodiment of the present invention.

FIG. 6 illustrates the process 198 of obtaining and using a random sampling of the input data set (step 104 illustrated in FIG. 2). In step 198a, the size $s_{min}$ of the random sample is calculated (the formula for this calculation is described in detail below). In step 198b, $S_{min}$ random points are selected from the data set S. These randomly selected points are then provided as the input data set to the clustering procedure described above (FIGS. 4–5). Efficient methods of drawing a sample randomly from data in a file in one pass and using constant space are well known in the art. For example, Jeff Vitter, in Random Sampling with a Reservoir, ACM Transactions on Mathematical Software 11(1): 37–57, 1985, discloses a well known method of drawing a random sample which is hereby incorporated by reference. The present invention employs one of these well-known methods for generating the random sample. In addition, the overhead of generating a random sample is very small compared to the time for performing clustering on the sample (random sampling typically takes less than two seconds to sample a few thousand points from a file containing hundred thousand or more points).

The present invention utilizes Chernoff bounds (described below) to analytically derive values for sample sizes s for which the probability of missing clusters is low. It is assumed that the probability of missing a cluster u is low if the sample contains at least f|u| points from the sample, where 0≦f≦1. This is a reasonable assumption to make since clusters will usually be densely packed and a subset of the points in the cluster is all that is required for clustering. Furthermore, the value of f depends on the cluster density as well as the intercluster separation. That is, the more well-separated and the more dense clusters become, the smaller the fraction of the points from each cluster that we need for clustering.

The present invention uses Chernoff bounds to determine the sample size s for which the probability that the sample contains fewer than f|u| points belonging to cluster u is less than δ, where 0≦δ≦1. Let $X_j$ be a random variable that is 1 if the $j^{th}$ point in the sample belongs to cluster u and 0 otherwise. It can be assumed that all $X_1, X_2, \ldots, X_s$ are independent 0–1 random variables. Note that $X_1, X_2, \ldots, X_s$ are independent Bernoulli trials such that for 1≦j≦s $$P(X_j = 1) = \frac{|u|}{N},$$

where N is the size of the entire data set. Thus, the number of data points in the sample belonging to cluster u is given by the random variable $$X = \sum_{j=1}^{s} Xj.$$

Also, the expected value of X, $$\mu = E[X] = E\left[\sum_{j=1}^{s} Xj\right] = \sum_{j=1}^{s} E[Xj] = \frac{s|u|}{N}.$$

Chernoff bounds state that for $0 \leq \epsilon \leq 1$, and independent Poisson trials $X_1, X_2, \ldots, X_s$, $$P[X < (1-\varepsilon)\mu] < e^{\frac{-\mu\varepsilon^2}{2}} \quad (1)$$

Thus, due to Chernoff bounds, the expression on the right hand side is an upper bound on the probability that the number of u's points in the sample, X, falls below the expected count, $\mu$, by more than $\epsilon\mu$. For the clustering application of the present invention, it is desired that the probability of the number of u's points in the sample, X, falling below f|u| to be no more than $\delta$. Stated otherwise, $$P[X < f|u|] < \delta \quad (2).$$

Equations (1) and (2) can be solved to derive the following value for the minimum sample size s. For a cluster u, equation (2) holds if the sample size s satisfies $$s \geq fN + \frac{N}{|u|}\log\left(\frac{1}{\delta}\right) + \frac{N}{|u|}\sqrt{\left(\log\left(\frac{1}{\delta}\right)\right)^2 + 2f|u|\log\left(\frac{1}{\delta}\right)} \quad (3)$$

Thus, based on the above equation, it can be concluded that for the sample to contain at least f|u| points belonging to cluster u (with high probability), the sample must contain more than a fraction f of the total number of points. Also, suppose $u_{min}$, is the smallest cluster desired, and $s_{min}$, is the result of substituting $|u_{min}|$ for |u| in the right hand side of equation (3). It is easy to observe that equation (3) holds for $s=s_{min}$ and all $|u| \geq |u_{min}|$. Thus, with a sample of size $s_{min}$ it is guaranteed with a high probability, $1-\delta$, that the sample contains at least f|u| points from an arbitrary cluster u. Also, assuming that there are k clusters, with a sample size of $s_{min}$ the probability of selecting fewer than f|u| points from any one of the clusters u is bounded above by k.

Equation (3) seems to suggest that the sample size required increases linearly with the input size N. However, this is misleading since as N increases, so does $|u_{min}|$, while the fraction f of each cluster that we need for clustering decreases. Typically, there is no interest in clusters that are very small relative to the input size since these tend to be statistically insignificant and are considered to be outliers. Thus, it can be assumed that the smallest cluster is some percentage of the average cluster size; that is, $$|u_{min}| = \frac{N}{k\rho},$$

where $\rho > 1$. Furthermore, depending on the geometry of the smallest cluster, in order to represent it adequately in the sample, a constant number of points, $\epsilon$, is needed from it. Thus, $$f = \frac{\varepsilon}{|u_{min}|}$$

and the sample contains $$\frac{\varepsilon|u|}{|u_{min}|}$$

points from an arbitrary cluster u. From the above discussion, the following equation can be derived for the minimum sample size.

$$S_{min} = \varepsilon k\rho + k\rho \log\left(\frac{1}{\delta}\right) + k\rho\sqrt{\left(\log\left(\frac{1}{\delta}\right)\right)^2 + 2\varepsilon\log\left(\frac{1}{\delta}\right)} \quad (4)$$

This implies that if only clusters whose size is greater than $$\frac{N}{k\rho}$$

and require $\epsilon$ points from the smallest cluster is desired, then a sample which is independent of the original number of data points is required. Preferably, for a k=100, $\rho=2$, $\epsilon=10$ and $\delta=0.001$, a sample size of about 6000 is sufficient for clustering. This is independent of N, thus making the method of the present invention very scaleable.

Figure 7:
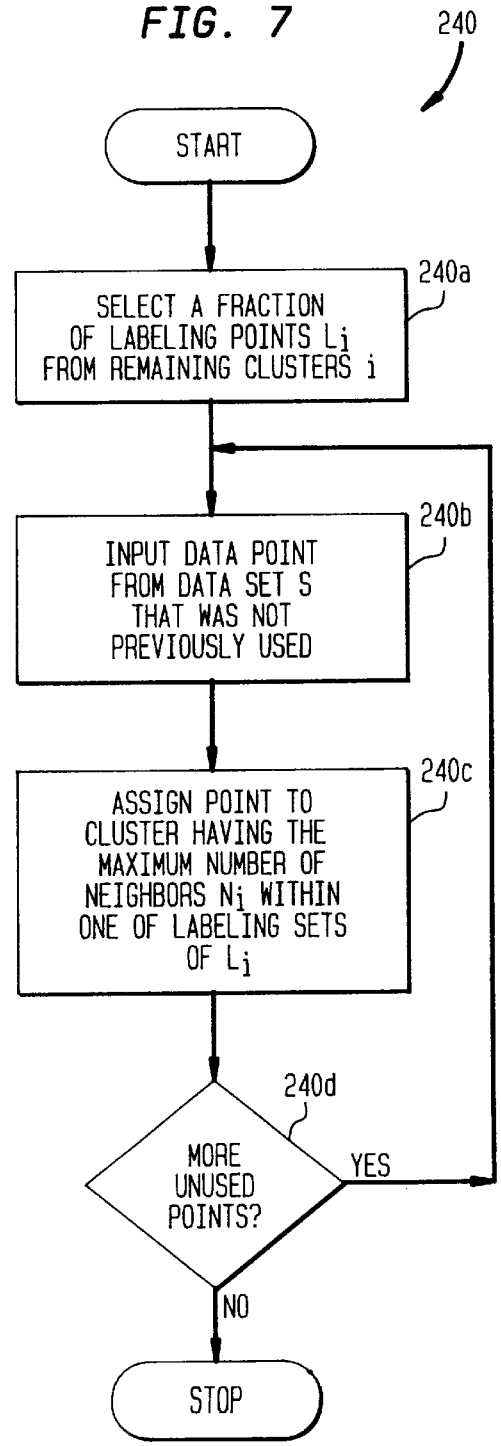
FIG. 7 illustrates, in flow chart form, the process of providing a cluster label to data in accordance with a preferred embodiment of the present invention.

Since the input to the clustering method of the present invention is a set of randomly sample points from the original data set, the final k clusters involve only a subset of the entire set of points. Therefore, a cluster labeling process (step 108 illustrated in FIG. 2) must be performed. Referring now to FIG. 7, the procedure 240 for assigning the appropriate cluster labels to the remaining data points begins by selecting a fraction of labeling points $L_i$ from each cluster i (step 240a). In step 240b a data point from the remaining data set S is input. In step 240c the data point is assigned to a cluster in which the point has the maximum amount of neighbors $N_i$ within one of the labeling sets of points $L_i$. That is, if a point has $N_i$ neighbors in set $L_i$, then the point is assigned to the cluster i for which $$\frac{N_i}{(|L_i|+1)^{f(\theta)}}$$

is the maximum. Preferably, $f(\theta)$ is $$\frac{1-\theta}{1+\theta}.$$

Step 240d determines if there are any more points in the data set S that were not used in the clustering method. If there are more points, the labeling procedure 240 continues at step 240b, otherwise the procedure 240 is completed and all points from the data set S have been assigned a cluster label.

In the clustering method of the present invention, outliers can be handled fairly effectively. The first pruning occurs by setting a value for $\theta$, the similarity threshold for points to be considered neighbors. Since by definition outliers are relatively isolated from the rest of the points, outliers will rarely cross the similarity threshold. This immediately allows the method of the present invention to discard the points with very few or no neighbors because they will never participate in the clustering. Preferably, as stated earlier, θ will have a value between 0.5 and 0.8.

However in some situations, outliers may be present as small groups of points that are loosely connected to the rest of the points in the data set. This suggests that these clusters, formed by outliers, will persist as small clusters during the clustering process. These cluster only participate in the clustering procedure when the number of clusters remaining is actually close to the number of clusters in the data. Therefore, in a preferred embodiment of the present invention, clustering will stop at a point when the number of remaining clusters is a small multiple of the desired number of clusters k. Then an outlier elimination procedure 235 is performed as shown in FIG. 8 (performed at the conclusion of step 106 illustrated in FIG. 2).

Figure 8:
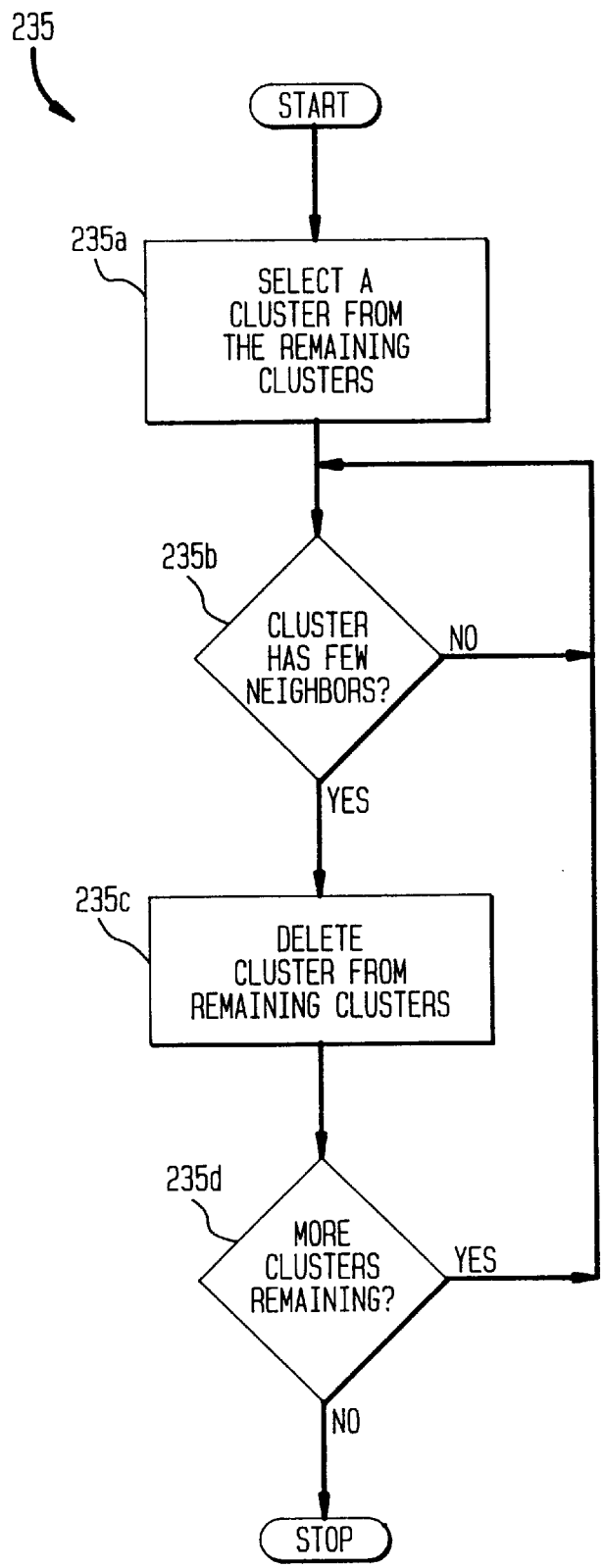
FIG. 8 illustrates, in flow chart form, the process of removing outliers in accordance with a preferred embodiment of the present invention.

As illustrated in FIG. 8, in step 235a, one of the remaining clusters is selected. Step 235b determines if the cluster has few neighbors (for example, 5 or less). If the selected cluster has few neighbors, the procedure continues at step 235c, where the cluster (of outliers) is deleted. Once the cluster is deleted, the procedure continues at step 235d. If step 235b determines that the selected cluster has more than a few neighbors, the procedure continues at step 235d. Step 235d determines if there are any more remaining clusters. If there are more clusters. the procedure continues back at step 235a, otherwise the procedure is completed leaving remaining clusters not comprised of outliers.

The invention is preferably carried out with a general purpose computer which is programmed to carry out the operations discussed above. However, it should be understood that one or more of the operations described may also be carried out in an equivalent manner by a special purpose computer or hardware circuits. Thus, one or more portions of the invention may be performed with hardware, firmware, software or any combination of these.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by letters patent of the united states is:

1. A computer based method of clustering related data stored in a computer database, said computer database stored on a computer readable medium and including a set of data points having categorical attributes, the method comprising the steps of:
   a) determining all neighbors for every data point within said computer database;
   b) establishing a cluster for every data point in said computer database;
   c) determining a total number of links between each cluster and every other cluster based on a number of common neighbors between each cluster and every other cluster;
   d) calculating a goodness measure between each cluster and every other cluster based upon the total number of links between each cluster and every other cluster and an estimated number of links between each cluster and every other cluster;
   e) merging a pair of clusters having the best goodness measures into a merged cluster;
   f) repeating steps c) through e) until a predetermined termination condition is met; and
   g) storing clusters which remain after step f) in a computer readable medium.

2. The method of claim 1 wherein the predetermined termination condition is obtaining a desired number of clusters.

3. The method of claim 1 wherein the predetermined termination condition is obtaining remaining clusters that do not have any links between said remaining clusters.

4. The method of claim 1 wherein the step of determining all neighbors for every data point within said computer database is determined by calculating a similarity between said data points.

5. The method of claim 4 wherein calculating the similarity between said data points comprises the steps of:
   a1) calculating a similarity ratio; and
   a2) assigning said points to be neighbors if said similarity ratio exceeds a similarity threshold.

6. The method of claim 5 wherein said similarity threshold is selected from the range of 0.5 to 0.8.

7. The method of claim 5 wherein the calculation of said similarity ratio is performed by dividing an intersection of said data points by a union of said data points.

8. A computer based method of clustering related data in a large computer database, said large computer database stored on a computer readable medium and including a set of data points having categorical attributes, the method comprising the steps of:
   a) selecting a random set of data points from said large computer database;
   b) determining all neighbors for every data point within said random set of data points;
   c) establishing a cluster for every data point within said random set of data points;
   d) determining a total number of links between each cluster and every other cluster based on a number of common neighbors between each cluster and every other cluster;
   e) calculating a goodness measure between each cluster and every other cluster based upon the total number of links between each cluster and every other cluster and an estimated number of links between each cluster and every other cluster;
   f) merging a pair of clusters having the best goodness measures into a merged cluster;
   g) repeating steps d) through f) until a predetermined termination condition is met; and
   h) storing clusters which remain after step g) in a computer readable medium.

9. The method of claim 8 wherein said random set of data points has a size determined by Chernoff bounds.

10. The method of claim 8 further comprising the step of:
    i) assigning a cluster label to said data points not included in said random set of said data points.

11. The method of claim 10 wherein the step of assigning a cluster label to said data points not included in said random set of data points comprises the steps of:
    i1) selecting a set of labeling points for each of said remaining clusters; and
    i2) assigning a cluster label to said data points not included in said random set of data points in which said data points have a maximum amount of neighbors with the labeling points of one of said clusters.

12. The method of claim 8 wherein the predetermined termination condition is obtaining a desired number of clusters.

13. The method of claim 8 wherein the predetermined termination condition is obtaining remaining clusters that do riot have any links between said remaining clusters.

14. The method of claim 8 wherein the step of determining all neighbors for every data point within said random set of data points is determined by calculating a similarity between said data points.

15. The method of claim 14 wherein calculating the similarity between said data points comprises the steps of:
  b1) calculating a similarity ratio; and
  b2) assigning said points to be neighbors if said similarity ratio exceeds a similarity threshold.

16. The method of claim 15 wherein said similarity threshold is selected from the range of 0.5 to 0.8.

17. The method of claim 15 wherein the calculation of said similarity ratio is performed by dividing an intersection of said data points by a union of said data points.

18. The method of claim 8 further including the step of:
  i) eliminating clusters comprised of outliers.

19. The method of claim 18 wherein the step of eliminating clusters comprised of outliers is performed by deleting clusters having a number of links less than a predetermined threshold from said remaining clusters.

20. The method of claim 19 wherein the predetermined threshold is 5 or less.

21. The method of claim 18 further comprising the step of:
  j) assigning a cluster label to said data points not included in said random set of said data points.

22. The method of claim 21 wherein the step of assigning a cluster label to said data points not included in said random set of data points comprises the steps of:
  j1) selecting a set of labeling points for each of said remaining clusters; and
  j2) assigning a cluster label to said data points not included in said random set of data points in which said data points have a maximum amount of neighbors with the labeling points of one of said clusters.

23. A computer readable storage medium containing a computer readable code for operating a computer to perform a clustering method on a computer database, said computer database including data points having categorical attributes, said clustering method comprises the steps of:
  a) determining all neighbors for every data point within said computer database;
  b) establishing a cluster for every data point in said computer database;
  c) determining a total number of links between each cluster and every other cluster based on a number of common neighbors between each cluster and every other cluster;
  d) calculating a goodness measure between each cluster and every other cluster based upon the total number of links between each cluster and every other cluster and an estimated number of links between each cluster and every other cluster;
  e) merging a pair of clusters having the best goodness measures into a merged cluster;
  f) repeating steps c) through e) until a predetermined termination condition is met; and
  g) storing clusters which remain after step f) in a computer readable medium.

24. The computer readable storage medium of claim 23 wherein the predetermined termination condition of said clustering method is obtaining a desired number of clusters.

25. The computer readable storage medium of claim 23 wherein the predetermined termination condition of said clustering method is obtaining remaining clusters that do not have any links between said remaining clusters.

26. The computer readable storage medium of claim 23 wherein said clustering method determines all neighbors of every data point within said database by calculating a similarity between said data points.

27. The computer readable storage medium of claim 26 wherein said clustering method performs calculates the similarity between said data points by calculating a similarity ratio and assigning said points to be neighbors if said similarity ratio exceeds a similarity threshold.

28. The computer readable storage medium of claim 27 wherein said similarity threshold is selected from the range of 0.5 to 0.8.

29. The computer readable storage medium of claim 27 wherein said clustering method calculates said similarity ratio by dividing the intersection of said data points by a union of said data points.

30. A computer readable storage medium containing a computer readable code for operating a computer to perform a clustering method on a large database, said large database including a set of data points having categorical attributes, said clustering method comprises the steps of:
  a) selecting a random set of data points from said large computer database;
  b) determining all neighbors for every data point within said random set of data points;
  c) establishing a cluster for every data point within said random set of data points;
  d) determining a total number of links between each cluster and every other cluster based on a number of common neighbors between each cluster and every other cluster;
  e) calculating a goodness measure between each cluster and every other cluster based upon the total number of links between each cluster and every other cluster and an estimated number of links between each cluster and every other cluster;
  f) merging a pair of clusters having the best goodness measures into a merged cluster;
  g) repeating steps d) through f) until a predetermined termination condition is met; and
  h) storing clusters which remain after step g) in a computer readable medium.

31. The computer readable storage medium of claim 30 wherein said random set of data points has a size determined by Chernoff bounds.

32. The computer readable storage medium of claim 30 wherein said clustering method further comprises the step of:
  i) assigning a cluster label to said data points not included in said random set of said data points.

33. The computer readable storage medium of claim 32 wherein the step of assigning a cluster label to said data points not included in said random set of data points comprises the steps of:
  i1) selecting a set of labeling points for each of said remaining clusters; and
  i2) assigning a cluster label to said data points not included in said random set of data points in which said data points have a maximum amount of neighbors with the labeling points of one of said clusters.

34. The computer readable storage medium of claim 30 wherein the predetermined termination condition of said clustering method is obtaining a desired number of clusters.

35. The computer readable storage medium of claim 30 wherein the predetermined termination condition of said clustering method is obtaining remaining clusters that do not have any links between said remaining clusters.

36. The computer readable storage medium of claim 30 wherein said clustering method step of determining all neighbors for every data point within said database is determined by calculating a similarity between said data points.

37. The computer readable storage medium of claim 36 wherein said clustering method calculates the similarity between said data points calculating a similarity ratio and assigning said points to be neighbors if said similarity ratio exceeds a similarity threshold.

38. The computer readable storage medium of claim 37 wherein said similarity threshold is selected from the range of 0.5 to 0.8.

39. The computer readable storage medium of claim 30 wherein said clustering method further includes the step of:

i) eliminating clusters comprised of outliers.

40. The computer readable storage medium of claim 39 wherein the clustering method step of eliminating clusters comprised of outliers is performed by deleting clusters having a number of links less than a predetermined threshold from said remaining clusters.

41. The computer readable storage medium of claim 40 wherein the predetermined threshold is 5 or less.

42. The computer readable storage medium of claim 41 wherein said clustering method further comprises the step of:

j) assigning a cluster label to said data points not included in said random set of said data points.

43. A programmed computer database clustering system comprising:

means for determining all neighbors for every data point within a computer database stored on a computer readable medium, said computer database including data points having categorical attributes;

means for establishing a cluster for every data point in said computer database;

means for determining a total number of links between each cluster and every other cluster based on a number of common neighbors between each cluster and every other cluster;

means for calculating a goodness measure between each cluster and every other cluster based upon the total number of links between each cluster and every other cluster and an estimated number of links between each cluster and every other cluster;

means for merging a pair of clusters having the best goodness measures into a merged cluster;

means for storing clusters which remain in a computer readable medium.

44. The programmed computer database clustering system of claim 43 wherein said means for means for determining all neighbors for every data point within a computer database stored on a computer readable medium calculates a similarity between said data points.

45. The programmed computer database clustering system of claim 43 wherein said means for determining all neighbors for every data point within a computer database stored on a computer readable medium comprises:

means for calculating a similarity ratio; and means for assigning said points to be neighbors if said similarity ratio exceeds a similarity threshold.

46. The programmed computer database clustering system of claim 45 wherein said means for assigning said points to be neighbors if said similarity ratio exceeds a similarity threshold uses a similarity threshold selected from the range of 0.5 to 0.8.

47. The programmed computer database clustering system of claim 46 wherein said means for calculating a similarity ratio calculates a similarity ratio by dividing an intersection of said data points by a union of said data points.

48. A programmed computer database clustering system comprising:

means for selecting a random set of data points from a large computer database stored on a computer readable medium, said large computer database including data points having categorical attributes;

means for determining all neighbors for every data point within said large computer database;

means for establishing a cluster for every data point in said computer database;

means for determining a total number of links between each cluster and every other cluster based on a number of common neighbors between each cluster and every other cluster;

means for calculating a goodness measure between each cluster and every other cluster based upon the total number of links between each cluster and every other cluster and an estimated number of links between each cluster and every other cluster;

means for merging a pair of clusters having the best goodness measures into a merged cluster;

means for storing clusters which remain in a computer readable medium.

49. The programmed computer database clustering system of claim 48 further comprising:

means for assigning a cluster label to said data points not included in said random set of said data points.

50. The programmed computer database clustering system of claim 49 wherein said means for assigning a cluster label comprises:

means for selecting a set of labeling points for each of said remaining clusters; and means for assigning a cluster label to said data points not included in said random set of data points in which said data points have a maximum amount of neighbors with the labeling points of one of said clusters.

51. The programmed computer database clustering system of claim 49 wherein said means for means for determining all neighbors for every data point within a computer database stored on a computer readable medium calculates a similarity between said data points.

52. The programmed computer database clustering system of claim 49 wherein said means for determining all neighbors for every data point within a computer database stored on a computer readable medium comprises:

means for calculating a similarity ratio; and means for assigning said points to be neighbors if said similarity ratio exceeds a similarity threshold.

53. The programmed computer database clustering system of claim 52 wherein said means for assigning said points to be neighbors if said similarity ratio exceeds a similarity threshold uses a similarity threshold selected from the range of 0.5 to 0.8.

54. The programmed computer database clustering system of claim 53 wherein said means for calculating a similarity ratio calculates a similarity ratio by dividing an intersection of said data points by a union of said data points.

55. The programmed computer database clustering system of claim 48 wherein said program further comprises:

means for eliminating clusters comprised of outliers.

56. The programmed computer database clustering system of claim 55 wherein said means for eliminating clusters comprised of outliers deleting clusters having a number of links less than a predetermined threshold from said remaining clusters.

57. The programmed computer database clustering system of claim 56 wherein the program further comprises:

means for assigning a cluster label to said data points not included in said random set of said data points.

* * * * *